(12) United States Patent
Namba et al.

(10) Patent No.: US 9,076,451 B2
(45) Date of Patent: Jul. 7, 2015

(54) OPERATING SYSTEM AND METHOD OF OPERATING

(75) Inventors: Toshiyuki Namba, Edogawa-ku (JP);
Hiroaki Sekiyama, Setagaya-ku (JP);
Tatsuyuki Oka, Machida (JP); Minako Fujishiro, Ota-ku (JP); Katsutoshi Okawa, Shiki (JP); Emi Otani, Kitamoto (JP); Atsushi Sasaki, Higashikurume (JP); Yasuhiko Fujita, Koto-ku (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 336 days.

(21) Appl. No.: 13/640,907

(22) PCT Filed: Apr. 12, 2011

(86) PCT No.: PCT/JP2011/059096
§ 371 (c)(1),
(2), (4) Date: Dec. 21, 2012

(87) PCT Pub. No.: WO2011/129335
PCT Pub. Date: Oct. 20, 2011

(65) Prior Publication Data
US 2013/0103405 A1    Apr. 25, 2013

(30) Foreign Application Priority Data
Apr. 12, 2010 (JP) .................................. 2010-091374

(51) Int. Cl.
*G10L 15/00* (2013.01)
*G10L 21/00* (2013.01)
(Continued)

(52) U.S. Cl.
CPC ............. *G10L 21/00* (2013.01); *G06F 17/2785* (2013.01); *G01C 21/3608* (2013.01); *G08G 1/0962* (2013.01); *G10L 15/26* (2013.01); *G10L 15/1822* (2013.01)

(58) Field of Classification Search
None
See application file for complete search history.

(56) References Cited

U.S. PATENT DOCUMENTS 7,260,531 B2 *  8/2007  Kosaka et al. ................. 704/255
8,374,845 B2 *  2/2013  Doi et al. ........................... 704/9
(Continued)

FOREIGN PATENT DOCUMENTS

JP   2002 341892   11/2002
JP   2004 333319   11/2004
(Continued)

OTHER PUBLICATIONS

International Search Report Issued May 24, 2011 in PCT/JP11/059096 Filed Apr. 12, 2011.
(Continued)

*Primary Examiner* — Daniel Abebe
(74) *Attorney, Agent, or Firm* — Oblon, McClelland, Maier & Neustadt, L.L.P.

(57) ABSTRACT

An operation determination processing section of a center extracts words included in the utterance of a driver and an operator, reads an attribute associated with each word from a synonym and related word in which an attribute is stored so as to be associated with each word, reads a domain of a candidate or the like for the task associated with the attribute from the synonym and related word in which domains of a candidate for a task associated with the read attribute or domains of a task to be actually performed are stored, totals the domains read for each word for words included in the utterance of the driver or the like, and estimates those related to a domain with a highest total score as the candidate for the task and the task to be actually performed. In this manner, it is possible to estimate the task with high accuracy.

12 Claims, 13 Drawing Sheets

(51) Int. Cl.
*G01C 21/36* (2006.01)
*G08G 1/0962* (2006.01)
*G10L 15/18* (2013.01)
*G06F 17/27* (2006.01)
*G10L 15/26* (2006.01)

(56) References Cited

U.S. PATENT DOCUMENTS

2008/0235018 A1 9/2008 Eggen et al.
2009/0083029 A1* 3/2009 Doi et al. .................. 704/200
2009/0318777 A1 12/2009 Kameyama

FOREIGN PATENT DOCUMENTS

JP  2005 30982  2/2005
JP  2006 349429 12/2006

OTHER PUBLICATIONS

Narendra Gupta, et al., "The AT&T Spoken Language Understanding System", IEEE Transactions on Audio Speech and Language Processing, vol. 14 No. 1, XP-002405477, Jan. 2006, pp. 213-222.

* cited by examiner

Fig.3

| id1 | name |
|---|---|
| 1 | POI |
| 2 | AREA |
| 3 | GENRE |
| 4 | CHAIN |

Fig.4

| id2 | name |
|---|---|
| a | (NO ATTRIBUTE) |
| b | MEALS |
| c | ACCOMMODATIONS |
| d | SHOPPING |
| e | CONVENIENCE STORE |
| f | GASOLINE STAND |
| g | BANK (POST OFFICE) |
| h | PARKING LOT |

Fig. 5

| id1 | id2 | DOMAIN 1 | DOMAIN 2 | DOMAIN 3 | DOMAIN 4 | DOMAIN 5 | DOMAIN 6 | DOMAIN 7 | DOMAIN 8 | DOMAIN 9 | DOMAIN 10 | DOMAIN 11 | DOMAIN 12 | DOMAIN 13 |
|---|---|---|---|---|---|---|---|---|---|---|---|---|---|---|
| 1 | a | O | x | x | x | x | x | x | x | x | x | x | x | x |
| 1 | b | x | x | x | x | O | x | x | x | x | x | x | x | x |
| 1 | c | x | x | x | x | x | x | x | x | x | x | x | x | x |
| 1 | d | x | x | x | x | x | x | x | x | x | x | x | x | x |
| 1 | e | x | x | x | x | x | x | x | x | x | x | x | x | x |
| 1 | f | x | x | x | x | x | x | x | x | x | x | x | x | x |
| 1 | g | x | x | x | x | x | x | x | x | x | x | x | x | x |
| 1 | h | x | x | x | x | x | x | x | x | x | x | x | x | x |
| 2 | a | O | x | x | O | O | O | O | O | O | O | O | O | O |
| 2 | b | O | x | x | O | O | O | O | O | O | O | O | O | O |
| 2 | c | O | x | x | O | O | O | O | O | O | O | O | O | O |
| 2 | d | O | x | x | O | O | O | O | O | O | O | O | O | O |
| 2 | e | O | x | x | O | O | O | O | O | O | O | O | O | O |
| 2 | f | O | x | x | O | O | O | O | O | O | O | O | O | O |
| 2 | g | x | x | x | O | O | O | O | O | O | O | O | O | O |
| 2 | h | x | x | x | x | x | x | x | x | x | x | x | x | x |
| 3 | a | x | x | x | x | x | x | x | x | x | x | x | x | x |
| 3 | b | x | x | x | x | O | x | x | x | x | x | x | x | x |
| 3 | c | x | x | x | x | x | O | O | x | x | x | x | x | x |
| 3 | d | x | x | x | x | x | x | x | O | O | x | x | x | x |
| 3 | e | x | x | x | x | x | x | x | x | x | x | x | x | x |
| 3 | f | x | x | x | x | x | x | x | x | x | x | x | x | x |
| 3 | g | x | x | x | x | O | O | O | O | O | O | O | x | x |
| 3 | h | x | x | x | x | x | x | x | x | x | x | x | x | x |
| 4 | a | x | x | x | x | x | x | x | x | x | x | x | x | x |
| 4 | b | x | x | x | x | x | x | O | O | O | x | x | x | x |
| 4 | c | x | x | x | x | x | x | x | x | x | x | x | x | x |
| 4 | d | x | x | x | x | x | x | x | x | x | x | x | x | x |
| 4 | e | x | x | x | x | x | x | x | x | x | x | x | x | x |
| 4 | f | x | x | x | x | x | x | x | x | x | x | x | x | x |
| 4 | g | x | x | x | x | x | x | x | x | x | O | O | x | x |
| 4 | h | x | x | x | x | x | x | x | x | x | x | O | x | x |

*Fig.6*

| DOMAIN | name |
|---|---|
| 1 | POI SEARCH – POI SPECIFIED - NAME |
| 2 | POI SEARCH – POI SPECIFIED – ADDRESS |
| 3 | POI SEARCH – POI SPECIFIED – ADDRESS |
| 4 | POI SEARCH – POI SPECIFIED - OTHERS |
| 5 | POI SEARCH – POI UNSPECIFIED - MEALS |
| 6 | POI SEARCH – POI UNSPECIFIED - ACCOMMODATIONS |
| 7 | POI SEARCH – POI UNSPECIFIED - SHOPPING |
| 8 | POI SEARCH – POI UNSPECIFIED - CONVENIENCE STORE |
| 9 | POI SEARCH – POI UNSPECIFIED – GASOLINE STAND |
| 10 | POI SEARCH – POI UNSPECIFIED - BANK (POST OFFICE) |
| 11 | POI SEARCH – POI UNSPECIFIED - PARKING LOT |
| 12 | POI SEARCH – POI UNSPECIFIED - OTHERS |
| 13 | INFORMATION SEARCH |
| 14 | OTHERS |

*Fig.8*

| NOTATION | PRONUNCIATION | RELIABILITY | ATTRIBUTE a | ATTRIBUTE b |
|---|---|---|---|---|
| IKEBUKURO | IKEBUKURO | 0.8 | 002 | 000 |
| DE | DE | 0.9 | 000 | 000 |
| A CHAIN | A CHAIN | 0.9 | 008 | 008 |
| O | O | 0.9 | 000 | 000 |
| SAGASITE | SAGASITE | 0.6 | 016 | 000 |
| HOSHIIN | HOSHIIN | 0.7 | 000 | 000 |
| DAKEDO | DAKEDO | 0.3 | 000 | 000 |
| ... | ... | ... | ... | ... |

Fig.9

| name | id a |
|------|------|
| POI | 1 |
| AREA | 2 |
| GENRE | 4 |
| CHAIN | 8 |
| SP KEYWORD | 16 |

*Fig.10*

| name | id b |
|---|---|
| MEALS | 1 |
| ACCOMMODATIONS | 2 |
| SHOPPING | 4 |
| CONVENIENCE STORE | 8 |
| GASOLINE STAND | 16 |
| BANK (POST OFFICE) | 32 |
| PARKING LOT | 64 |

*Fig.11*

| id a | id b | DOMAIN 1 | DOMAIN 2 | DOMAIN 3 | DOMAIN 4 | DOMAIN 5 | DOMAIN 6 | DOMAIN 7 | DOMAIN 8 | DOMAIN 9 | DOMAIN 10 | DOMAIN 11 | DOMAIN 12 | DOMAIN 13 | DOMAIN 14 |
|---|---|---|---|---|---|---|---|---|---|---|---|---|---|---|---|
| 1 | 0 | 3 | 0 | 0 | | | | | | | | | | | 0 |
| 1 | 1 | 3 | 0 | 0 | 1 | 1 | 1 | 1 | 1 | 1 | 1 | 1 | 1 | 1 | 0 |
| 1 | 2 | 3 | 0 | 0 | 1 | 1 | 1 | 1 | 1 | 1 | 1 | 1 | 1 | 1 | 0 |
| 1 | 4 | 3 | 0 | 0 | 1 | 1 | 1 | 1 | 1 | 1 | 1 | 1 | 1 | 1 | 0 |
| 1 | 8 | 3 | 0 | 0 | 1 | 1 | 1 | 1 | 1 | 1 | 1 | 1 | 1 | 1 | 0 |
| 1 | 16 | 3 | 0 | 0 | 3 | 3 | 3 | 3 | 3 | 3 | 3 | 3 | 3 | 3 | 0 |
| 1 | 32 | 3 | 0 | 0 | 3 | 3 | 3 | 3 | 3 | 3 | 3 | 3 | 3 | 3 | 0 |
| 1 | 64 | 3 | 0 | 0 | 3 | 3 | 3 | 3 | 3 | 3 | 3 | 3 | 3 | 3 | 0 |
| 2 | 0 | 3 | 0 | 0 | 3 | 3 | 3 | 3 | 3 | 3 | 3 | 3 | 3 | 3 | 0 |
| 2 | 1 | 3 | 0 | 0 | 3 | 3 | 3 | 3 | 3 | 3 | 3 | 3 | 3 | 3 | 0 |
| 2 | 2 | 3 | 0 | 0 | 3 | 3 | 3 | 3 | 3 | 3 | 3 | 3 | 3 | 3 | 0 |
| 2 | 4 | 3 | 0 | 0 | 3 | 3 | 3 | 3 | 3 | 3 | 3 | 3 | 3 | 3 | 0 |
| 2 | 8 | 3 | 0 | 0 | 3 | 3 | 3 | 3 | 3 | 3 | 3 | 3 | 3 | 3 | 0 |
| 2 | 16 | 3 | 0 | 0 | 3 | 3 | 3 | 3 | 3 | 3 | 3 | 3 | 3 | 3 | 0 |
| 2 | 32 | 3 | 0 | 0 | 1 | 0 | 0 | 0 | 0 | 0 | 0 | 0 | 0 | 1 | 0 |
| 2 | 64 | 3 | 0 | 0 | 1 | 3 | 3 | 3 | 3 | 3 | 3 | 0 | 0 | 1 | 0 |
| 4 | 0 | 1 | 0 | 0 | 1 | 0 | 0 | 0 | 0 | 0 | 0 | 0 | 0 | 1 | 0 |
| 4 | 1 | 1 | 0 | 0 | 1 | 0 | 0 | 0 | 0 | 0 | 0 | 0 | 0 | 1 | 0 |
| 4 | 2 | 1 | 0 | 0 | 1 | 0 | 0 | 0 | 0 | 0 | 0 | 0 | 0 | 1 | 0 |
| 4 | 4 | 1 | 0 | 0 | 1 | 0 | 0 | 0 | 0 | 0 | 0 | 0 | 0 | 1 | 0 |
| 4 | 8 | 1 | 0 | 0 | 1 | 0 | 0 | 0 | 3 | 0 | 0 | 0 | 0 | 1 | 0 |
| 4 | 16 | 1 | 0 | 0 | 1 | 0 | 0 | 0 | 0 | 0 | 0 | 3 | 1 | 1 | 0 |
| 4 | 32 | 1 | 0 | 0 | 1 | 1 | 1 | 1 | 1 | 1 | 1 | 1 | 1 | 1 | 0 |
| 4 | 64 | 1 | 0 | 0 | 1 | 3 | 3 | 3 | 1 | 1 | 1 | 1 | 1 | 1 | 0 |
| 8 | 0 | 1 | 0 | 0 | 1 | 1 | 1 | 1 | 1 | 1 | 1 | 1 | 1 | 1 | 0 |
| 8 | 1 | 1 | 0 | 0 | 1 | 1 | 1 | 1 | 1 | 1 | 1 | 1 | 1 | 1 | 0 |
| 8 | 2 | 1 | 0 | 0 | 1 | 1 | 1 | 1 | 1 | 1 | 1 | 1 | 1 | 1 | 0 |
| 8 | 4 | 1 | 0 | 0 | 1 | 1 | 1 | 1 | 1 | 1 | 1 | 1 | 1 | 1 | 0 |
| 8 | 8 | 1 | 0 | 0 | 1 | 1 | 1 | 3 | 3 | 3 | 1 | 1 | 1 | 1 | 0 |
| 8 | 16 | 1 | 0 | 0 | 0 | 0 | 0 | 0 | 0 | 0 | 0 | 0 | 0 | 0 | 0 |
| 8 | 32 | 0 | 0 | 0 | 0 | 0 | 0 | 0 | 0 | 0 | 3 | 0 | 0 | 0 | 0 |
| 8 | 64 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 |
| 16 | 1 | 0 | 0 | 0 | 0 | 0 | 0 | 0 | 0 | 0 | 0 | 0 | 0 | 0 | 0 |
| 16 | 2 | 0 | 0 | 0 | 0 | 0 | 0 | 0 | 0 | 0 | 0 | 0 | 0 | 0 | 0 |
| 16 | 4 | 0 | 0 | 0 | 0 | 0 | 0 | 0 | 0 | 0 | 0 | 0 | 0 | 0 | 0 |
| 16 | 8 | 0 | 0 | 0 | 0 | 0 | 0 | 0 | 0 | 0 | 0 | 0 | 0 | 0 | 0 |
| 16 | 16 | 0 | 0 | 0 | 0 | 0 | 0 | 0 | 0 | 0 | 0 | 0 | 0 | 0 | 0 |
| 16 | 32 | 0 | 0 | 0 | 0 | 0 | 0 | 0 | 0 | 0 | 0 | 0 | 0 | 0 | 0 |
| 16 | 64 | 0 | 0 | 0 | 0 | 0 | 0 | 0 | 0 | 0 | 0 | 0 | 0 | 0 | 0 |

*Fig.12*

| NOTATION | ATTRIBUTE a | ATTRIBUTE b |
|---|---|---|
| ⋮ | ⋮ | ⋮ |
| IKEBUKURO | 002 | 000 |
| A CHAIN | 008 | 008 |
| SAGASITE | 016 | 000 |

Fig.13

| EXAMPLE DOMAIN 1 | POI SEARCH | —POI SPECIFIED— | NAME | SCORE=4 |
|---|---|---|---|---|
| | ATTRIBUTE a | ATTRIBUTE b | | |
| IKEBUKURO | 0 | 2 | | 3 |
| A CHAIN | 8 | 8 | | 1 |
| SEARCHING | 0 | 16 | | 0 |

⋮

| EXAMPLE DOMAIN 8 | POI SEARCH | —POI UNSPECIFIED— | CONVENIENCE STORE | SCORE=6 |
|---|---|---|---|---|
| | ATTRIBUTE a | ATTRIBUTE b | | |
| IKEBUKURO | 0 | 2 | | 3 |
| A CHAIN | 8 | 8 | | 3 |
| SEARCHING | 0 | 16 | | 0 |

⋮

SCORE OF ATTRIBUTE

OPERATING SYSTEM AND METHOD OF OPERATING

TECHNICAL FIELD

The present invention relates to an operating system and a method of operating, and relates to an operating system and a method of operating for estimating the requested task from the information included in the utterance of a speaker.

BACKGROUND ART

Since a driver who is driving a vehicle is busy with a driving operation, it is difficult to perform a non-driving operation, such as destination setting of a navigation system. Accordingly, a device has been proposed which estimates a task requested by a driver by analyzing the utterance of the driver and executes the task without requiring the operation of the driver. For example, Patent Literature 1 discloses a system in which a driver of a vehicle and an operator of the external center communicate with each other, the external center recognizes the utterance of the driver, and display information that the driver wants is displayed on a display device in the vehicle.

CITATION LIST

Patent Literature

[Patent Literature 1] Japanese Unexamined Patent Application Publication No. 2004-333319

SUMMARY OF INVENTION

Technical Problem

In the technique described above, however, for example, when making the operator perform destination setting, the driver needs to tell the operator the current location, the destination, and a requested task specifically as a command. Accordingly, since the driver can speak only at the level of a command, the convenience for the driver is low. In addition, since the accuracy of estimating the requested task from the utterance of the driver is low, the reliability of the operation of the system is low. For this reason, in the technique described above, only the utterance as a command relevant to the limited operation is accepted in order to prevent erroneous recognition as much as possible. Therefore, this is a system that assists only the limited operation.

The present invention has been made in view of such a situation, and it is an object of the present invention to provide an operating system and a method of operating which improves the convenience for a user so that the accuracy of estimating the requested task from the utterance is improved.

Solution to Problem

The present invention is an operating system including a requested task estimation unit that estimates a candidate for a requested task from information included in an utterance of a first speaker. The requested task estimation unit extracts a plurality of words included in the utterance of the first speaker, reads an attribute associated with each word from a database in which one or a plurality of attributes are stored so as to be associated with each word, reads a domain of a candidate for the task associated with the attribute from a database in which one or a plurality of domains of a candidate for the task associated with the one or plural read attributes are stored, totals the domains read for each word for the plurality of words included in the utterance of the first speaker, and estimates a candidate for the task related to a domain with a highest total score as a candidate for the requested task.

According to this configuration, the requested task estimation unit extracts a plurality of words included in the utterance of the first speaker, reads an attribute associated with each word from the database in which one or a plurality of attributes are stored so as to be associated with each word, reads a domain of a candidate for the task associated with the attribute from the database in which one or a plurality of domains of a candidate for the task associated with the one or plural read attributes are stored, totals the domains read for each word for the plurality of words included in the utterance of the first speaker, and estimates a candidate for the task related to a domain with a highest total score as a candidate for the requested task. Therefore, it is possible to estimate a candidate for the task with high accuracy.

In addition, as examples of the "candidate for the task" in the present invention, services for the user including search, route guidance, operation of a navigation system, and apparatus setting change may be mentioned as will be described later. Alternatively, examples of the "candidate for the task" in the present invention include search processes with different search conditions, such as different search keywords, as will be described later.

In this case, the requested task estimation unit may total, for the domain read for each word, a score according to the degree of importance of the domain with respect to the word and estimates a candidate for the task related to a domain with the highest total score as a candidate for the requested task.

According to this configuration, the requested task estimation unit totals, for the domain read for each word, a score according to the degree of importance of the domain with respect to the word and estimates a candidate for the task related to a domain with the highest total score as a candidate for the requested task. Therefore, it is possible to estimate a candidate for the task with high accuracy according to the degree of importance of the domain with respect to a word.

In addition, it is possible to further include an action task selection unit that selects a task to be performed from the candidate for the requested task, which has been estimated by the requested task estimation unit, on the basis of information included in an utterance of a second speaker.

According to this configuration, the requested task estimation unit estimates a candidate for a requested task from the information included in the utterance of the first speaker, and the action task selection unit selects a task to be performed according to the candidate for the requested task, which has been estimated by the requested task estimation unit, on the basis of the information included in the utterance of the second speaker. For this reason, the task is estimated from the information included in the utterances of two persons of the first and second speakers. Accordingly, since it is possible to reduce the time or the number of utterances required to estimate the task, it is possible to improve the convenience for the user. As a result, it is possible to improve the accuracy of estimating the requested task from the utterance.

In this case, the action task selection unit may extract a plurality of words included in the utterance of the second speaker, read an attribute associated with each word from a database in which one or a plurality of attributes are stored so as to be associated with each of the words, read a domain of the task associated with the attribute from a database in which one or a plurality of domains of the task associated with the one or plural read attributes are stored, total the domains read for each word for the plurality of words included in the utterance of the first speaker, and select the task related to a domain with a highest total score as the task corresponding to a requested task.

According to this configuration, the action task selection unit extracts a plurality of words included in the utterance of the second speaker, reads an attribute associated with each word from the database in which one or a plurality of attributes are stored so as to be associated with each of the words, reads a domain of the task associated with the attribute from the database in which one or a plurality of domains of the task associated with the one or plural read attributes are stored, totals the domains read for each word for the plurality of words included in the utterance of the first speaker, and selects the task related to a domain with the highest total score as the task corresponding to a requested task. Therefore, it is possible to select the task more accurately.

In this case, the action task selection unit may total, for the domain read for each word, a score according to the degree of importance of the domain with respect to the word and select the task related to a domain with the highest total score as the requested task.

According to this configuration, the action task selection unit totals, for the domain read for each word, a score according to the degree of importance of the domain with respect to the word and selects the task related to a domain with the highest total score as the requested task. Therefore, the task can be selected with high accuracy according to the degree of importance of the domain with respect to a word.

On the other hand, the present invention is a method of operating including a requested task estimation step of estimating a requested task from information included in an utterance of a first speaker. In the requested task estimation step, a plurality of words included in the utterance of the first speaker are extracted, an attribute associated with each word is read from a database in which one or a plurality of attributes are stored so as to be associated with each word, a domain of a candidate for the task associated with the attribute is read from a database in which one or a plurality of domains of a candidate for the task associated with the one or plural read attributes are stored, the domains read for each word are totaled for the plurality of words included in the utterance of the first speaker, and a candidate for the task related to a domain with a highest total score is extracted as a candidate for the requested task.

In this case, in the requested task estimation step, a score according to the degree of importance of the domain with respect to the word may be totaled for the domain read for each word, and a candidate for the task related to a domain with the highest total score may be estimated as a candidate for the requested task.

In addition, it is possible to further include an action task selection step of selecting a task to be performed from the candidate for the requested task, which has been estimated in the requested task estimation step, on the basis of information included in an utterance of a second speaker.

In this case, in the requested task estimation step, a plurality of words included in the utterance of the first speaker may be extracted, an attribute associated with each word may be read from a database in which one or a plurality of attributes are stored so as to be associated with each word, a domain of a candidate for the task associated with the attribute may be read from a database in which one or a plurality of domains of a candidate for the task associated with the one or plural read attributes are stored, the domains read for each word may be totaled for the plurality of words included in the utterance of the first speaker, and a candidate for the task related to a domain with a highest total score may be estimated as a candidate for the requested task.

In this case, in the action task selection step, a score according to the degree of importance of the domain with respect to the word may be totaled for the domain read for each word, and the task related to a domain with the highest total score may be selected as the requested task.

Advantageous Effects of Invention

According to the operating system and the method of operating of the present invention, it is possible to improve the convenience for a user so that the accuracy of estimating the requested task from the utterance can be improved.

BRIEF DESCRIPTION OF DRAWINGS

FIG. 3 is an attribute 1 table showing the phrase attribute 1.

FIG. 4 is an attribute 2 table showing the phrase attribute 2.

FIG. 5 is a domain correspondence table showing the domains associated with the phrase attributes 1 and 2.

FIG. 6 is a domain-request task correspondence table showing the requested task associated with the domain.

FIG. 8 is a table showing recognized words and attributes a and b given in advance for each word.

FIG. 9 is an attribute a table showing the phrase attribute a.

FIG. 10 is an attribute b table showing the phrase attribute b.

FIG. 11 is an attribute score calculation table which defines the score according to the degree of importance of each domain.

FIG. 12 is a table showing parts of recognized words and the attributes a and b.

FIG. 13 is a view showing an example of score calculation.

DESCRIPTION OF EMBODIMENTS

Hereinafter, an operating system related to an embodiment of the present invention will be described with reference to the drawings.

Figure 1:
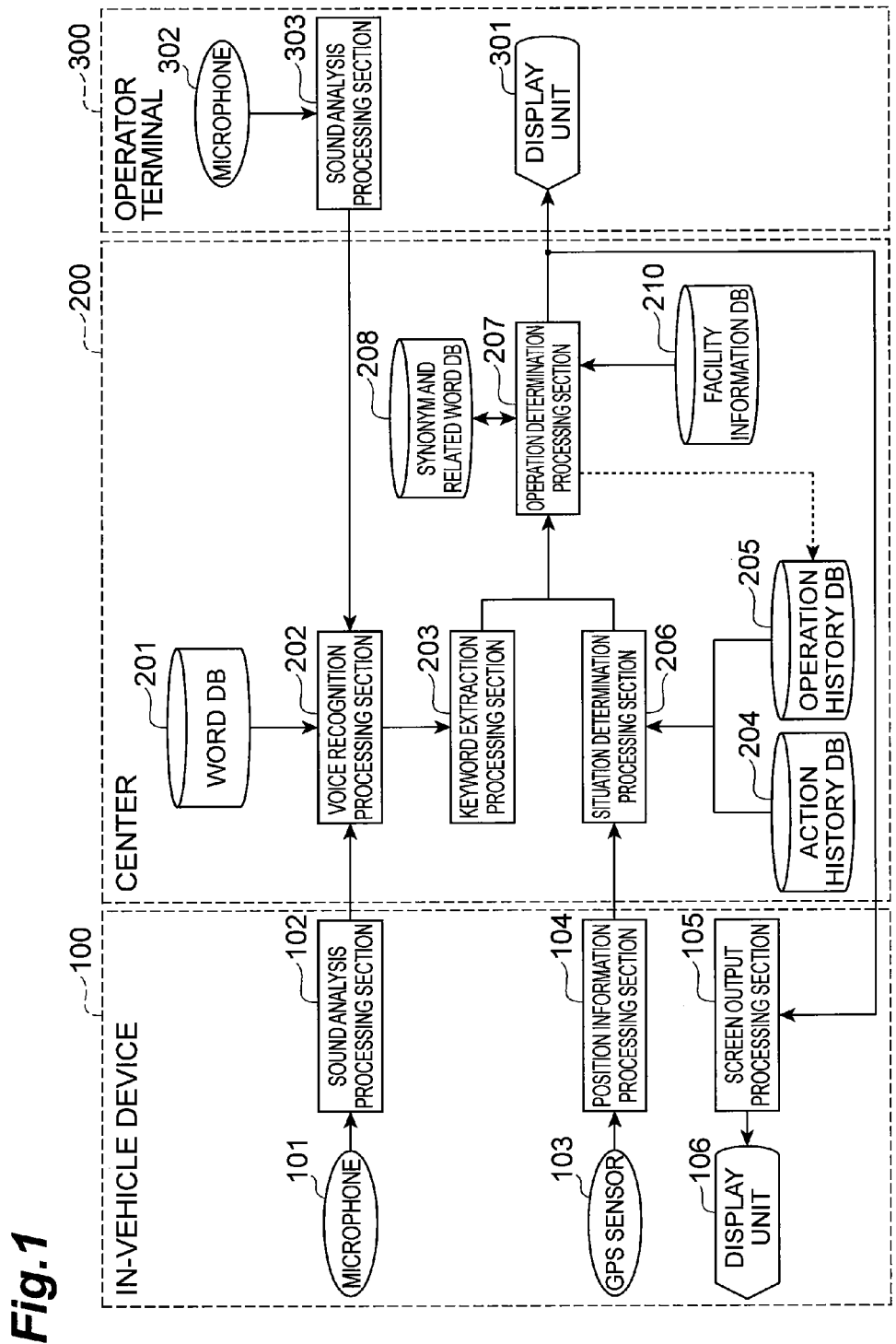
FIG. 1 is a view showing the configuration of an operating system related to a first embodiment.

As shown in FIG. 1, an operating system related to a first embodiment of the present invention includes an in-vehicle device 100, a center 200, and an operator terminal 300 that are connected to each other through a communication line. The operating system of the present embodiment is for estimating the task that an operator should perform according to a user's request by allowing a user, who uses the in-vehicle device 100 mounted in a vehicle, and an operator, which operates the operator terminal 300, to communicate with each other through the center 200.

As shown in FIG. 1, the in-vehicle device 100 has a microphone 101, a sound analysis processing section (DSR-C: Distributed Speech Recognition Client) 102, a GPS sensor 103, a position information processing section 104, a screen output processing section 105, and a display unit 106. The microphone 101 detects the utterance of a user (first speaker) who is, for example, a driver in a vehicle and outputs the detection result to the sound analysis processing section 102 as a voice signal. The sound analysis processing section 102 compresses the size of the utterance data and transmits the compressed utterance data to the center 200 so that voice recognition processing is performed in the center 200.

The GPS sensor 103 receives a signal from a GPS (Global Positioning System) satellite through a GPS receiver and measures the position of the vehicle from the difference in each signal. The in-vehicle device 100 includes a navigation device (not shown) which performs route guidance for a user on the basis of map data and the position information measured by the GPS sensor 103. The position information processing section 104 collects the position information detected by the GPS sensor 103 and transmits the position information to the center 200.

The screen output processing section 105 is for receiving the information transmitted from the center 200 and displaying the information on the display unit 106 for the user who is a driver.

The center 200 has a vocabulary DB 201, a voice recognition processing section (DSR-S) 202, a keyword extraction processing section 203, an action history DB 204, an operation history DB 205, a situation determination processing section 206, an operation determination processing section 207, and a synonym and related word DB 208.

The vocabulary DB 201 is a database of a recognition dictionary in which a vocabulary that is an object of voice recognition is accumulated. A paraphrasing vocabulary, such as a nickname or an alias of the same word, is also included in the vocabulary DB 201.

The voice recognition processing section (DSR-S: Distributed Speech Recognition Server) 202 performs dictation recognition of the user's utterance data transmitted from the sound analysis processing section 102 of the in-vehicle device 100 and converts the result to text. In addition, the voice recognition processing section 202 performs dictation recognition of the operator's utterance data transmitted from a sound analysis processing section 303 of the operator terminal 300 and converts the result to text.

The keyword extraction processing section 203 extracts words as keywords, which are required to estimate the task, from the utterance text that has been converted to text by the voice recognition processing section 202.

The action history DB 204 stores information regarding the action history, such as past set destinations, travel routes, and time zones, of the driver which is a user of the vehicle in which the in-vehicle device 100 is mounted. In addition, although the information regarding the past action history of the driver is stored in the action history DB 204 of the center 200 in the present embodiment, the information regarding the past action history of the driver may be stored in a device located outside the center 200.

The operation history DB 205 stores information regarding the operation history, such as the past utterance content and search conditions, of the driver which is a user of the vehicle in which the in-vehicle device 100 is mounted.

The situation determination processing section 206 acquires the position information of the vehicle in which the in-vehicle device 100 is mounted, which has been transmitted from the position information processing section 104 of the in-vehicle device 100, and also acquires the information regarding the action history stored in the action history DB 204 and the operation history stored in the operation history DB 205. In addition, the situation determination processing section 206 also acquires the current time.

The operation determination processing section 207 combines the keyword extraction result of the keyword extraction processing section 203 and the user information acquired by the situation determination processing section 206, and estimates a candidate for the task requested by the user while referring to the information regarding synonyms and related words stored in the synonym and related word DB. In addition, the operation determination processing section 207 selects and executes the task that the operator should perform on the basis of the task candidate estimation result. The estimation result of the operation determination processing section 207 is output to the screen output processing section 105 of the in-vehicle device 100 and a display unit 301 of the operator terminal 300.

In the synonym and related word DB 208, information regarding synonyms and related words that have meanings relevant to the vocabulary stored in the vocabulary DB 201 is stored. In addition, the utterance data and the position information from the in-vehicle device 100 and the estimation result from the center 200 are transmitted and received between the in-vehicle device 100 and roadside infrastructure, which is connected to the center 200, through short-range communication or the like. In a facility information DB 210, information regarding various facilities in which the vehicle mounted with the in-vehicle device 100 can drop by is stored.

The operator terminal 300 has the display unit 301, a microphone 302, and the sound analysis processing section (DSR-C: Distributed Speech Recognition Client) 303. The display unit 301 is for receiving the information transmitted from the operation determination processing section 207 of the center 200 and displaying the information for the operator.

The microphone 302 detects the utterance of an operator (second speaker) and outputs the detection result to the sound analysis processing section 303 as a voice signal. The sound analysis processing section 303 compresses the size of the utterance data and transmits the compressed utterance data to the center 200 so that voice recognition processing is performed in the center 200.

Hereinafter, the operation of the operating system of the present embodiment will be described. In the following example, in order to show the principle of estimating a task from the utterance, a method of estimating a task called POI (Position Information) search from the utterance of a driver will mainly be described first. For example, a driver of a vehicle in which the in-vehicle device 100 is mounted speaks "XXX (convenience store name) in Ikebukuro?" to the microphone 101. The sound analysis processing section 102 extracts only the minimum information required for the voice recognition processing section 202 of the center 200 to perform voice recognition and transmits the information to the voice recognition processing section 202 of the center 200 as utterance data.

The voice recognition processing section 202 converts the utterance data to text using dictation recognition, and sets it as utterance text. In this case, when a paraphrasing expression, such as a nickname or an alias, is included in the keyword, the voice recognition processing section 202 outputs a basic expression, which replaces the paraphrasing expression, while referring to the vocabulary DB 201. In the above example, replacement of the basic expression is not performed since no paraphrasing expression is included in the utterance. In addition, definition of the paraphrasing expression and the basic expression is not universal but is appropriately determined by the specifications of the vocabulary DB 201.

Figure 2:
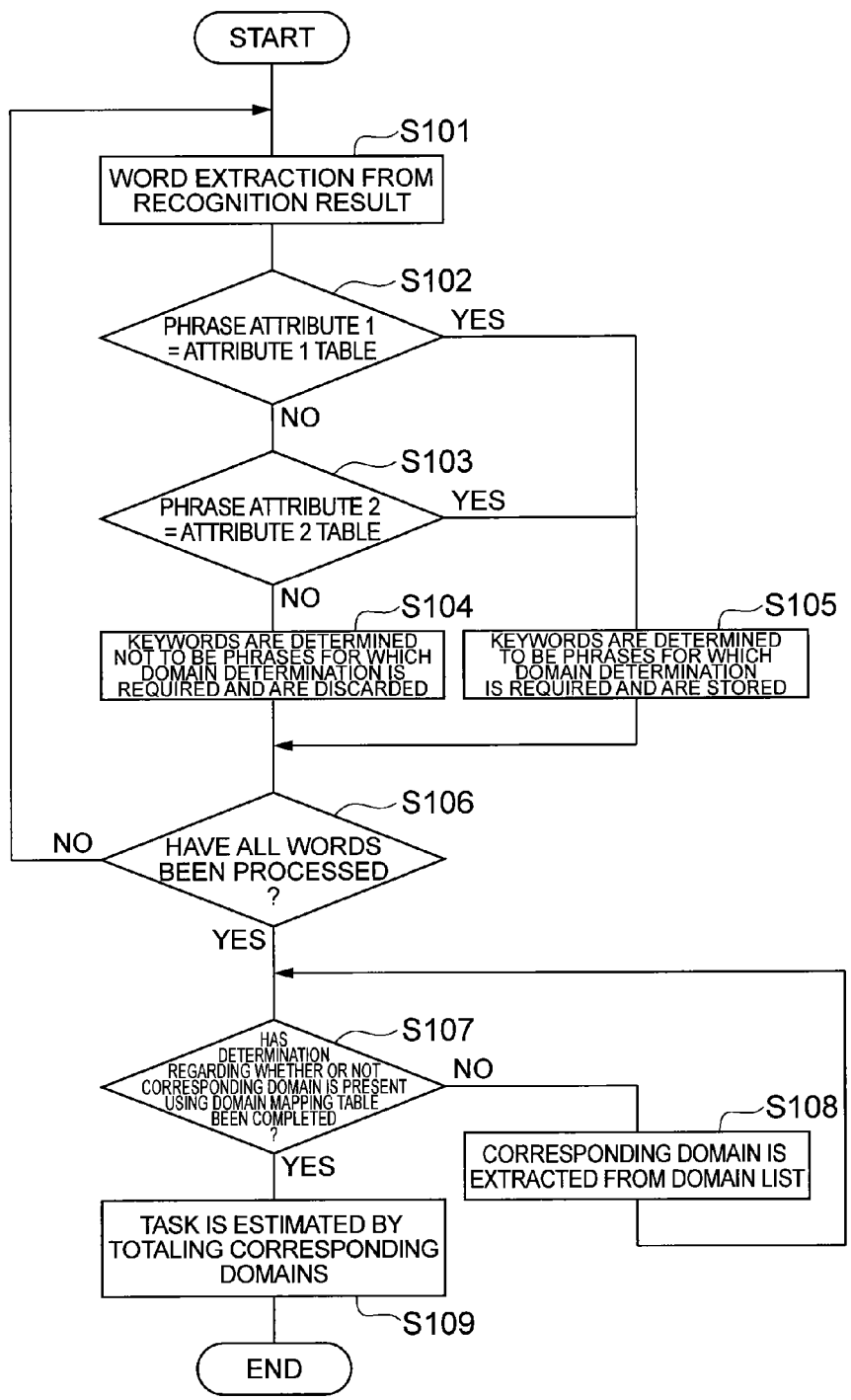
FIG. 2 is a flow chart showing the process of extracting the domain of a requested task from the voice recognition result related to the first embodiment.

The keyword extraction processing section 203 parses the utterance text output from the voice recognition processing section 202. In the parsing, the keyword extraction processing section 203 performs decomposition of parts of speech and determination of the dependency relations based on morphological analysis. The keyword extraction processing section 203 extracts only the words of parts of speech, which are required to determine the meaning, from the part-of-speech decomposition result and transmits them to the operation determination processing section 207. Here, the part of speech required to determine the meaning refers to a part of speech which is likely to have a meaning for the purpose estimation by itself, such as a noun, a verb, an adjective, and an adjective verb. For example, in this example, "Ikebukuro" and "XXX (convenience store name)" are extracted. From the above, as shown in FIG. 2, word extraction from the voice recognition result is completed (S101).

Figure 3:
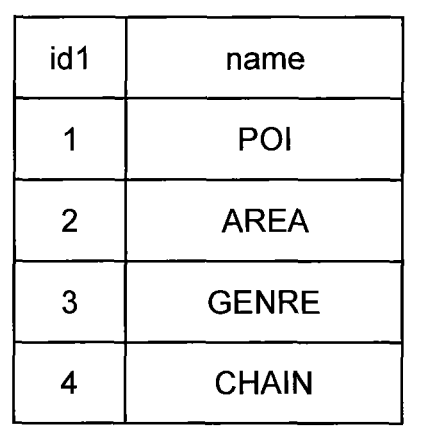

The operation determination processing section 207 collates the extracted keyword, which has been received from the keyword extraction processing section 203, with the rules of determination defined in advance and estimates a requested task demanded from the driver. In the present embodiment, a plurality of phrase attributes are stored in the synonym and related word DB 208. The phrase attributes are stored in the synonym and related word DB 208 so as to be associated with predetermined keywords. For example, an attribute 1 table shown in FIG. 3 is defined for the phrase attribute 1. The operation determination processing section 207 determines whether or not each extracted keyword is associated with the phrase attribute 1 table of the phrase attribute 1 (S102). The phrase attribute 1 associated with the keyword "Ikebukuro" is id1=2:"area". The phrase attribute 1 associated with the keyword "XXX (convenience store name)" is id1=4:"chain". Such phrase attributes may also be generated from the attribution information of each facility of the facility information DB 210.

For example, an attribute 2 table shown in FIG. 4 is defined for the phrase attribute 2. The operation determination processing section 207 determines whether or not each extracted keyword is associated with the phrase attribute 2 table of the phrase attribute 2 (S103). The phrase attribute 2 associated with the keyword "Ikebukuro" is id2=a:"no attribute". The phrase attribute 2 associated with the keyword "XXX (convenience store name)" is id2=e:"convenience store".

In this example, since the extracted keywords "Ikebukuro" and "XXX (convenience store name)" are associated with either the phrase attribute 1 table or the phrase attribute 2 table, the operation determination processing section 207 stores these keywords as phrases for which domain determination is required (S104). On the other hand, when the extracted keywords are not associated with any of the phrase attribute 1 table, the phrase attribute 2 table, and other phrase attribute tables, the operation determination processing section 207 determines that the keywords are not phrases for which domain determination is required and discards the keywords (S105).

When the operation determination processing section 207 has processed all keywords (S106), the operation determination processing section 207 determines which is the corresponding domain using the domain correspondence table for each extracted keyword, and extracts the corresponding domain from the domain list (S107 and S108).

A domain correspondence table shown in FIG. 5 is stored in the synonym and related word DB 208. In the domain correspondence table, domains 1 to 13 of tasks corresponding to each of the phrase attribute 1 and the phrase attribute 2 are defined. Each of the tasks of the domains 1 to 13 is defined as shown in FIG. 6.

For example, for the keyword "Ikebukuro", the phrase attribute 1 is id1=2:"area" and the phrase attribute 2 is id2=a:"no attribute". Accordingly, domains 1, 4, 5, 6, 7, 8, 9, 10, 11, 12, and 13 indicated by circles in the table of FIG. 5 correspond thereto. In addition, for the keyword "XXX (convenience store name)", the phrase attribute 1 is id1=4:"chain" and the phrase attribute 2 is id2=e:"convenience store". Accordingly, the domain 8 indicated by the circle in the table of FIG. 5 corresponds thereto.

When determination of the domains using the domain correspondence table is completed for all keywords (S107), the operation determination processing section 207 estimates the requested task by totaling the corresponding domains (S109). For example, in this example, the domain corresponding to both the keywords "Ikebukuro" and "XXX (convenience store name)" is "POI search-POI unspecified-convenience store" of the domain 8. Then, the operation determination processing section 207 estimates the "POI (Position Information) search-POI unspecified-convenience store" of the domain 8 as a task.

The operation determination processing section 207 transmits the task estimation result to the display unit 301 of the operator terminal 300 and the screen output processing section 105 of the in-vehicle device 100. In the operator terminal 300, the operator speaks to the microphone 302 on the basis of the task estimation result, so that the same process as the utterance of the driver is performed. As a result, a process of checking the corresponding task as a task, which is to be actually performed, is performed. On the other hand, also in the in-vehicle device 100, the driver speaks to the microphone 101 so that the same process is performed. By repeating such a process, task estimation can be performed accurately in a short time.

According to the present embodiment, the operation determination processing section 207 of the center 200 extracts a plurality of words included in the utterance of a driver and an operator, reads an attribute associated with each word from the synonym and related word DB 208 in which one or a plurality of attributes are stored so as to be associated with each word, reads a domain of a candidate for a task associated with the attribute or a domain of a task to be actually performed from the synonym and related word DB 208 in which one or a plurality of domains of the candidate for the task associated with the one or plural read attributes or one or a plurality of domains of the task to be actually performed are stored, totals the domains read for each word for the plurality of words included in the utterance of the driver and the operator, and estimates the candidate for the task related to a domain with the highest total score or the task to be actually performed as the candidate for the task and the task to be actually performed. Therefore, it is possible to estimate the task more accurately.

In addition, according to the present embodiment, the operation determination processing section 207 of the center 200 estimates a candidate for the requested task from the information included in the utterance of the driver (user), and selects a task to be performed according to the estimated task candidate on the basis of the information included in the utterance of the operator. For this reason, the task is estimated from the information included in the utterances of two persons of the driver and the operator. Accordingly, since it is possible to reduce the time or the number of utterances required to estimate the task, it is possible to improve the convenience for the user. As a result, it is possible to improve the accuracy of estimating the requested task from the utterance.

Hereinafter, a second embodiment of the present invention will be described. In the present embodiment, a score according to the degree of importance of the domain with respect to the word is totaled for the domain read for each word, and a candidate for the task related to a domain with the highest total score or the task related to a domain with the highest total score may be estimated as a candidate for the requested task or a task to be actually performed.

Figure 7:
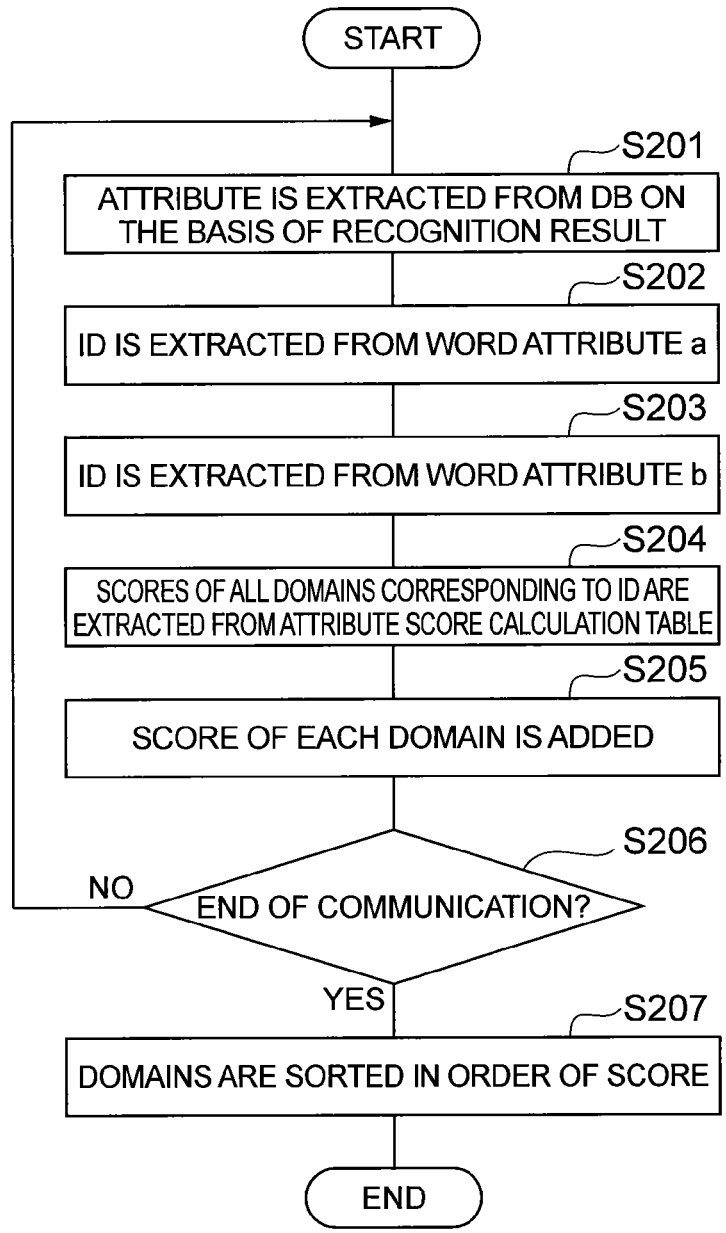
FIG. 7 is a flow chart showing the process of extracting the domain of a requested task from the voice recognition result related to a second embodiment.

For example, a driver of a vehicle in which the in-vehicle device 100 is mounted speaks "I want to search for the A chain (convenience store name) in Ikebukuro?" to the microphone 101. As shown in FIGS. 7 and 8, each word included in the utterance is recognized, and attributes of each word are extracted from the database on the basis of the recognition result (S201). In addition, as in the first embodiment, such phrase attributes may also be generated from the attribution information of each facility of the facility information DB 210. In addition, as shown in FIG. 8, it is also possible to set a factor called reliability and to exclude a word with less reliability than a predetermined threshold value from the process or give a weighting to the process according to the reliability.

As shown in FIG. 7, the operation determination processing section 207 extracts an ID from the attribute a of a word (S202). In addition, as shown in FIGS. 8 and 9, the ID of the attribute a for the word "Ikebukuro" based on the voice recognition result is "area" of IDa=2. In addition, the ID of the attribute a for the word "A chain" based on the voice recognition result is "chain" of IDa=8. In addition, as shown in FIG. 7, the operation determination processing section 207 extracts an ID from the attribute b of the word (S203). In addition, as shown in FIGS. 8 and 10, the ID of the attribute b for the word "Ikebukuro" based on the voice recognition result is not present. In addition, the ID of the attribute b for the word "A chain" based on the voice recognition result is "convenience store" of IDb=8.

The operation determination processing section 207 calculates the scores of all domains corresponding to the ID from the attribute score calculation table which defines a score according to the degree of importance for each domain as shown in FIG. 11 (S204). For example, for the word "A chain", the score of the domain 1 is 1 since IDa of the attribute a is 8 and IDb of the attribute b is 8. On the other hand, the score of the domain 8 is 3.

In this manner, the operation determination processing section 207 adds the score of each domain for each word recognized in speaking (S205). For example, as shown in FIG. 12, for the word "Ikebukuro", IDa of the attribute a is 2 and IDb of the attribute b is 0. In addition, for the word "A chain", IDa of the attribute a is 8 and IDb of the attribute b is 8. In addition, for the word "searching", IDa of the attribute a is 0 and IDb of the attribute b is 16.

For each of these words, the score of each domain is calculated using the attribute score calculation table in FIG. 11. For example, as shown in FIG. 13, for "POI search-POI specified-name" of the domain 1, the score of the word "Ikebukuro" is 3, the score of the word "A chain" is 1, and the score of the word "searching" is 0. Accordingly, the total value of the scores of the domain 1 is 4. On the other hand, for "POI search-POI unspecified-convenience store" of the domain 8, the score of the word "Ikebukuro" is 3, the score of the word "A chain" is 3, and the score of the word "searching" is 0. Accordingly, the total value of the scores of the domain 1 is 6.

The operation determination processing section 207 repeats the same process for all domains to the end of the communication (S206), and sorts the domains in order of the total score (S207). For example, assuming that a domain with a highest score is "POI search-POI unspecified-convenience store" of the domain 8, the operation determination processing section 207 estimates that "POI search-POI unspecified-convenience store" of the domain 8 is a requested task and there is a high possibility that the task will be the task that is actually performed.

In the present embodiment, the operation determination processing section 207 of the center 200 extracts a plurality of words included in the utterance of a driver and an operator, reads an attribute associated with each word from the synonym and related word DB 208 in which one or a plurality of attributes are stored so as to be associated with each word, reads a domain of a candidate for a task associated with the attribute or a domain of a task to be actually performed from the synonym and related word DB 208 in which one or a plurality of domains of the candidate for the task associated with the one or plural read attributes or one or a plurality of domains of the task to be actually performed are stored, totals a score according to the degree of importance of the domain with respect to the word, for each domain read for each word, for the plurality of words included in the utterance of the driver and the operator, and estimates the candidate for the task related to a domain with the highest total score or the task to be actually performed as the candidate for the task and the task to be actually performed. Therefore, it is possible to estimate the task more accurately.

In addition, it is needless to say that the present invention is not limited to the above-described embodiments and various changes may be made without departing from the spirit or scope of the present invention. For example, in the above embodiments, the explanation has been focused on the form in which a driver who uses an in-vehicle device and an operator who uses an operator terminal communicate with each other. However, for example, other than the in-vehicle device, the present invention may also be applied to a case where it is difficult for some or all of the speakers to perform fine manual operation for some reason, and is effective. In addition, the number of speakers is not limited to 2, and it is also possible to estimate a task on the basis of the utterance from three or more speakers.

INDUSTRIAL APPLICABILITY

According to the operating system and the method of operating of the present invention, it is possible to improve the convenience for a user so that the accuracy of estimating the requested task from the utterance can be improved.

REFERENCE SIGNS LIST

100: in-vehicle device
101: microphone
102: sound analysis processing section (DSR-C)
103: GPS sensor
104: position information processing section
105: screen output processing section
106: display unit
200: center
201: word DB
202: voice recognition processing section (DSR-S)
203: keyword extraction processing section
204: action history DB
205: operation history DB
206: situation determination processing section
207: operation determination processing section
208: synonym and related word DB
210: facility information DB
300: operator terminal
301: display
302: microphone
303: sound analysis processing section

The invention claimed is:

1. An operating system comprising:
at least one processor configured to:
estimate a candidate for a requested task from information included in an utterance of a first speaker, including:
extracting a plurality of words included in the utterance of the first speaker,
reading an attribute associated with each of the words from a database in which one or a plurality of attributes are stored so as to be associated with each of the words,
reading a domain of a candidate for the task associated with the attribute from a database in which one or a plurality of domains of a candidate for the task associated with the one or plural read attributes are stored,
totaling the domains read for each word for the plurality of words included in the utterance of the first speaker, and
estimating a candidate for the task related to a domain with a highest total score as a candidate for the requested task; and
select a task to be performed from the candidate for the requested task, which has been estimated, on the basis of information included in an utterance of a second speaker.

2. The operating system according to claim 1, wherein the at least one processor is further configured to:
total, for the domain read for each of the words, a score according to the degree of importance of the domain with respect to the word, and
estimate a candidate for the task related to a domain with the highest total score as a candidate for the requested task.

3. The operating system according to claim 1, wherein the at least one processor is further configured to:
extract a plurality of words included in the utterance of the second speaker,
read an attribute associated with each of the words from a database in which one or a plurality of attributes are stored so as to be associated with each of the words,
read a domain of the task associated with the attribute from a database in which one or a plurality of domains of the task associated with the one or plural read attributes are stored,
total the domains read for each word for a plurality of words included in the utterance of the second speaker, and
estimate the task related to a domain with a highest total score as the requested task.

4. The operating system according to claim 3, wherein the at least one processor is further configured to:
total, for the domain read for each of the words, a score according to the degree of importance of the domain with respect to the word, and
select the task related to a domain with the highest total score as the requested task.

5. The operating system according to claim 2, wherein the at least one processor is further configured to:
extract a plurality of words included in the utterance of the second speaker,
read an attribute associated with each of the words from a database in which one or a plurality of attributes are stored so as to be associated with each of the words,
read a domain of the task associated with the attribute from a database in which one or a plurality of domains of the task associated with the one or plural read attributes are stored,
total the domains read for each word for a plurality of words included in the utterance of the second speaker, and
estimate the task related to a domain with a highest total score as the requested task.

6. The operating system according to claim 5, wherein the at least one processor is further configured to:
total, for the domain read for each of the words, a score according to the degree of importance of the domain with respect to the word, and
select the task related to a domain with the highest total score as the requested task.

7. A method of operating comprising:
estimating a requested task from information included in an utterance of a first speaker,
wherein the estimating includes:
extracting a plurality of words included in the utterance of the first speaker,
reading an attribute associated with each of the words from a database in which one or a plurality of attributes are stored so as to be associated with each of the words,
reading a domain of a candidate for the task associated with the attribute from a database in which one or a plurality of domains of a candidate for the task associated with the one or plural read attributes are stored,
totaling the domains read for each word for the plurality of words included in the utterance of the first speaker, and
extracting a candidate for the task related to a domain with a highest total score as a candidate for the requested task; and
selecting a task to be performed from the candidate for the requested task, which has been estimated, on the basis of information included in an utterance of a second speaker.

8. The method of operating according to claim 7, wherein the estimating further includes:
totaling a score according to the degree of importance of the domain with respect to the word for the domain read for each of the words, and
estimating a candidate for the task related to a domain with the highest total score as a candidate for the requested task.

9. The method of operating according to claim 7, wherein the selecting further includes:
extracting a plurality of words included in the utterance of the second speaker,
reading an attribute associated with each of the words is read from a database in which one or a plurality of attributes are stored so as to be associated with each of the words,
reading a domain of the task associated with the attribute from a database in which one or a plurality of domains of the task associated with the one or plural read attributes are stored,
totaling the domains read for each word for a plurality of words included in the utterance of the second speaker, and
estimating the task related to a domain with a highest total score as the task corresponding to a requested task.

10. The method of operating according to claim 9, wherein the selecting further includes:
- totaling a score according to the degree of importance of the domain with respect to the word for the domain read for each of the words, and
- selecting the task related to a domain with the highest total score as the requested task.

11. The method of operating according to claim 8, wherein the selecting further includes:
- extracting a plurality of words included in the utterance of the second speaker,
- reading an attribute associated with each of the words from a database in which one or a plurality of attributes are stored so as to be associated with each of the words,
- reading a domain of the task associated with the attribute from a database in which one or a plurality of domains of the task associated with the one or plural read attributes are stored,
- totaling the domains read for each word for a plurality of words included in the utterance of the second speaker, and
- estimating the task related to a domain with a highest total score as the task corresponding to a requested task.

12. The method of operating according to claim 11, wherein the selecting further includes:
- totaling a score according to the degree of importance of the domain with respect to the word for the domain read for each of the words, and
- selecting the task related to a domain with the highest total score as the requested task.

* * * * *